Dec. 2, 1941.   G. B. STILLWAGON, JR., ET AL   2,264,728
COVER FOR UNIVERSAL JOINTS
Filed April 23, 1940
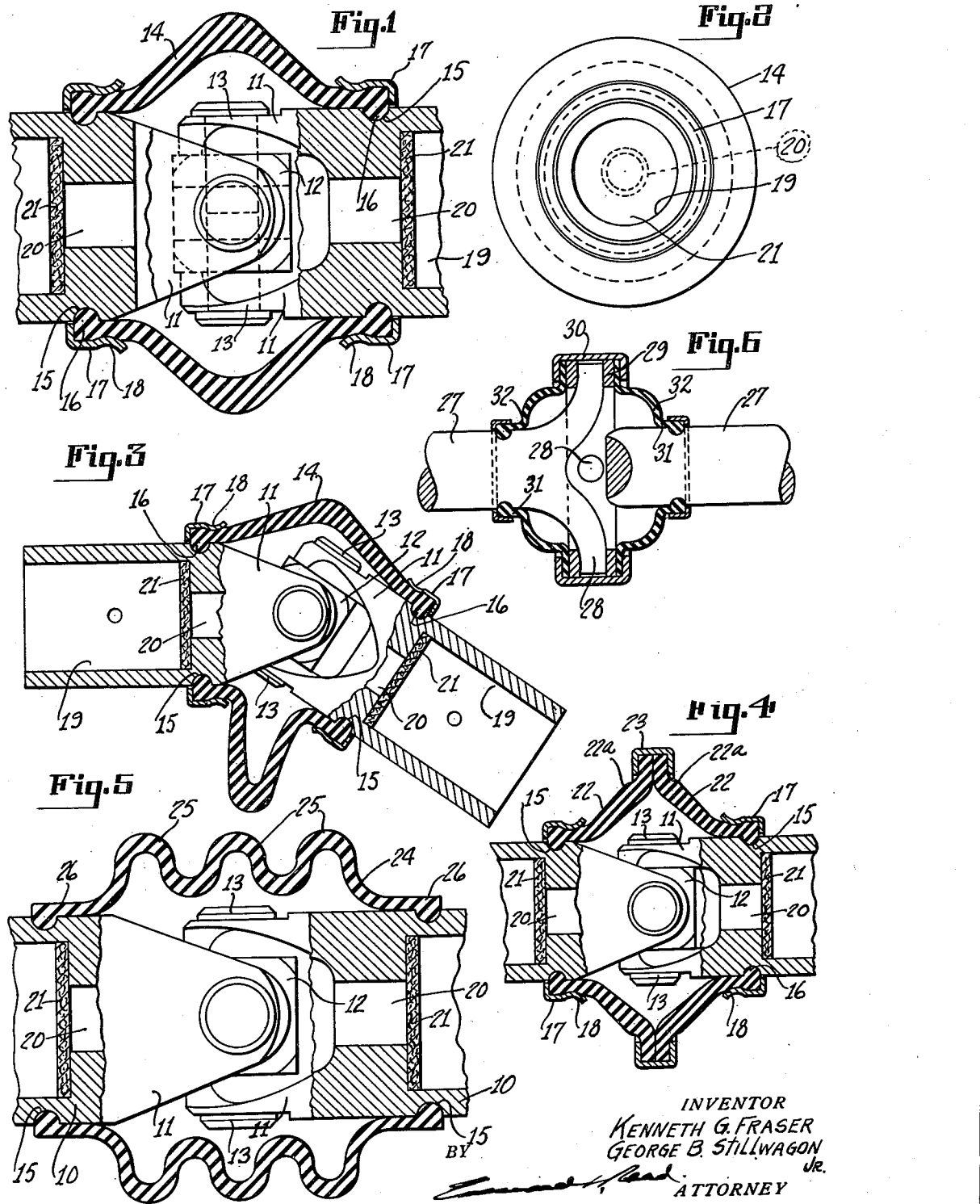
INVENTOR
KENNETH G. FRASER
GEORGE B. STILLWAGON JR.
ATTORNEY Patented Dec. 2, 1941

2,264,728

UNITED STATES PATENT OFFICE 2,264,728

COVER FOR UNIVERSAL JOINTS

George B. Stillwagon, Jr., and Kenneth G. Fraser, Dayton, Ohio

Application April 23, 1940, Serial No. 331,170

13 Claims. (Cl. 64—32)

This invention relates to a cover for a universal joint or the like and is designed primarily for use on airplanes but may be used on mechanisms of various kinds. One object of the invention is to provide a simple inexpensive cover which will exclude grit and dirt from the joint and will also confine lubricant about the pivotal connections of the joint.

A further object of the invention is to provide a cover which will prevent or minimize and dampen the relative movement of the pivotally connected parts of the joint due either to lateral or torsional vibration. This feature of the joint is of particular importance in airplanes and other installations where the shafts are subjected to vibrations when idle as well as when in operation, as the relative movement of the pivot members often causes more wear on the parts than does the operation thereof. Further, the damping of the relative movement of the parts largely prevents noise or resonant vibrations which in some installations are objectionable.

A further object of the invention is to provide a cover of such a character that each part thereof will be forced to collapse or flex outwardly as it passes between the angularly positioned coupling members.

A further object of the invention is to provide a cover which will serve to circulate the lubricant about the pivotal connections of the joint.

A further object of the invention is to provide means for establishing grease tight joints between the cover and the coupling members, and for holding the end portions of the cover against movement with relation to the coupling members.

Other objects of the invention will appear as the cover is described in detail.

In the accompanying drawing Fig. 1 is a longitudinal sectional view, partly in elevation, of one embodiment of our cover, showing the same applied to a universal joint; Fig. 2 is an end elevation of the same; Fig. 3 is a view similar to Fig. 1, showing the position of the cover when the coupling members are in angular relation one to the other; Fig. 4 is a view similar to Fig. 1 showing the cover formed in two parts; Fig. 5 is a view similar to Fig. 1, showing the cover provided with a plurality of circumferential corrugations; and Fig. 6 is a longitudinal section through a modified form of cover adapted for application to a different type of universal joint.

In this drawing we have illustrated several embodiments of the invention but it will be understood that these have been chosen for the purpose of illustration only and that the cover may take various forms and may be applied to universal joints or like devices of various kinds.

The universal joint comprises coupling members 10 pivotally connected one to the other for rotation about intersecting axes. The coupling members and the means for pivotally connecting them may be of any suitable kind and, as shown in Fig. 1 the coupling members are each provided with jaws 11 arranged in planes at substantially right angles to the planes of the jaws of the other coupling member. A connecting block 12 is arranged between the jaws of both pairs and is pivotally connected with those jaws by pivot members 13.

The cover comprises a tubular structure of flexible material extending about the pivotal connections of the joint and having an enlarged intermediate portion spaced from those connections, and having end portions adapted to fit about the respective coupling members in spaced relation to the pivotal connections. The cover may take various forms and may include one or a plurality of parts and it may be connected with the joint in various ways. As shown in Fig. 1, the cover 14 comprises two cup-shaped, and preferably substantially frusto-conical, portions molded, or otherwise formed, in one piece with the larger ends of the frusto-conical portions connected one with the other. The outer ends of these frusto-conical portions are shaped to fit about the coupling members outwardly beyond the jaws 11, and suitable means may be provided for holding the end portions of the tubular structure against movement with relation to the coupling members. As here shown, the coupling members are provided with circumferential recesses 15 and the end portions of the tubular cover fit snugly about the coupling members and are provided with inwardly extending circumferential projections or beads 16 which extend into the respective recesses 15 and hold the end portions of the cover against longitudinal movement with relation to the coupling members. For the purpose of positively retaining the beads 16 in the recesses and to resist any tendency of the end portions to rotate on the coupling members retaining devices are provided. Each of these devices, as here shown, comprises an annular clip 17 of rigid material extending about the coupling member and fitting snugly about the outer side of the adjacent end portion of the cover. Preferably that portion of the clip which overlaps the end of the cover is shaped, as shown at 18, to press into the material of the cover and thus hold the clip against longitudinal displacement with relation to the cover.

The cover may be made of any suitable flexible material but in order to accomplish all the purposes thereof it is preferably formed of resilient material. A synthetic rubber, such as that known as "neoprene," is well adapted for this purpose as it is not only resilient and elastic but is also relatively impervious to many lubricants. The cover as formed, by molding or otherwise, is of such overall length that the beads 16 are spaced one from the other a distance less than the distance between the recesses 15 of the connected coupling members, when the latter are in alinement one with the other. Therefore in order to insert the beads in the recesses it is necessary to extend the cover and to thereby place the same under longitudinal tension. This longitudinal tension of the cover tends to draw the two coupling members one to the other and to hold the bearings in firm contact with the pivot members and thereby minimize, if it does not positively prevent, the relative movement of the connected parts of the joint due to lateral vibration. It may be here stated that the wear on the ordinary universal joint is often due to the relative movement or rattle of the pivoted members to a much greater extent than it is due to the torque exerted thereon, this is particularly true of joints installed in airplanes and in other installations where the joint is subjected to substantial vibrations. If a shaft or like device which is connected with one of the coupling members is laterally distorted, in assembling or otherwise, it will frequently rotate with a wobbling motion, thereby tending to cause a torsional vibration of the coupling member with which it is connected. The resilient cover, being so connected with the coupling member as to dampen relative rotation of the parts, strongly resists and substantially prevents such torsional vibration.

While it is obvious that a cover of the type above described will prevent the entrance of dirt or grit into the joint it should be noted that the location of the connections between the cover and the coupling members is such as to cause any metallic grit which may be produced in connecting the joint with the driving and driven parts to also be excluded. The openings in the coupling members which receive the pins or other connecting members for attaching the coupling member to the shaft are not formed until the joint is assembled on the shaft and the exact relative positions thereof determined. In boring or otherwise forming these openings and effecting the driving connection fine metallic grit is often produced which may find its way into the pivotal connections of the joint. The cover having been applied to the joint prior to its connection with the driving and driven shaft will effectively prevent any such grit entering the joint.

As the coupling members rotate about intersecting axes each part of the intermediate portion of the cover will flex first in one direction and then in the other and it is desirable that as each part of this intermediate portion passes between the angularly positioned coupling members it should flex outwardly to prevent the possibility of the cover material coming in contact with the pivotal connections and being injured thereby. For this purpose the intermediate portion of the cover is so constructed that it is forced to buckle or flex outwardly. This is preferably accomplished by thickening the cover at the points where it would normally flex, thereby preventing the inward flexing of the same. In that form shown in Fig. 1, the cover is thickened at its point of greatest diameter and this thickness gradually decreases toward the end portions of the cover, so that the inclined walls will flex outwardly on the circumferential lines of least resistance and will fold one toward the other on a substantially central circumferential line, as shown in Fig. 3. The flexing or buckling of the cover and its subsequent expansion as it continues to rotate acts on the lubricant within the cover with a pumping action which tends to cause the same to flow or circulate across the pivotal connections and thereby maintain adequate lubrication. In that form of the cover shown in Fig. 1 the coupling members are provided at their outer ends with longitudinal recesses 19 to receive the shafts and these recesses 19 are connected with the spaces between the jaws by bores 20 and when the cover is used as a lubricant container the openings 20 are closed by inserting in the outer recesses 19 disks 21 of fiber, or other suitable material, the disks being preferably inserted with a pressed fit so that they will be firmly retained therein, and will maintain an oil tight seal.

As above stated, the cover may be made in a single part or a plurality of parts and in Fig. 4 we have shown the same as formed of two parts 22 each of which is substantially frusto-conical in shape, the two portions being arranged with their larger ends in opposed relation, and suitable means are provided for firmly connecting the opposed portions of the two parts of the cover one to the other. In the present instance this is accomplished by pressing or spinning an annular clip 23 about the edge portions of the two parts of the cover. The smaller end portions of the two parts of the cover are mounted on the respective coupling members in the manner above described and the operation is substantially the same as that described in connection with the cover of Fig. 1. If desired, the inclined walls of the cover may be thickened adjacent their points of connection one with the other, as shown at 22a, to control the flexing thereof.

In the form shown in Fig. 5 the intermediate portion 24 of the cover is provided with a plurality of circumferential corrugations 25 which expand and collapse during the rotation of the cupling members about intersecting axes in substantially the same manner as the cover of Fig. 1, the end portions 26 of this cover being connected with the coupling members 10 in the same manner as above described. Preferably the corrugations 25 are thickened at their points of flexing, that is, at the inner and outer curved portions of the respective corrugations, to control the direction in which this enlarged portion will buckle, due to the expansion and contraction thereof during the rotation of the joint. The thickening of the material of the cover at these points of flexing insures that the cover will buckle outwardly and will not buckle in such a manner as to contact with the pivotal connections.

In Fig. 6 we have shown a further modification of the cover to adapt it to a universal joint of a different construction. This joint comprises coupling members 27 each of which is provided with a pair of substantially radial pivotal members 28 rigid with the respective coupling members. The pivot members of each coupling member are arranged in planes at substantially right angles to the planes of the pivot members of the other coupling member and are pivotally mounted in suitable bearings formed in an annular member 29. In applying the cover to such a joint it is preferably made in two parts, as in Fig. 4, but instead of connecting the two parts directly to one another they are rigidly secured, at their points of largest diameter, to the respective sides of the annular member 29, this being preferably accomplished by an annular connecting member or clip 30. The smaller end portions 31 of the two parts of the cover are connected with the coupling members 27, in the same manner as above described. The walls of the two parts of the cover, between their points of connection with the annular member 29 and the coupling member 27, are shown at 32 as curved outwardly so that they will flex in much the same manner as above described and, if desired, they may be thickened to control the direction in which they will flex.

While we have shown and described certain embodiments of our invention we wish it to be understood that we do not desire to be limited to the details thereof as various modifications may occur to a person skilled in the art.

Having now fully described our invention, what we claim as new and desire to secure by Letters Patent, is:

1. A cover for a universal joint of the type which includes two coupling members pivotally connected for rotation about intersecting axes, said cover comprising a tubular structure of flexible material having its end portions shaped to fit snugly about the respective coupling members in spaced relation to said pivotal connections and having means to hold the same against lengthwise movement on said coupling members, said structure also having an intermediate portion of enlarged diameter, the larger portion of said structure being of greater stiffness than those portions adjacent the ends thereof to cause said intermediate portion to flex outwardly when said joint rotates with the members thereof in angular relation one to the other.

2. A cover for a universal joint of the type which includes two coupling members pivotally connected for rotation about intersecting axes, said cover comprising a tubular structure of flexible material having its end portions shaped to fit snugly about the respective coupling members in spaced relation to said pivotal connections and having means to hold the same against lengthwise movement on said coupling members, said structure also having an intermediate portion of enlarged diameter, said enlarged portion being of a thickness greater than the thickness of the smaller end portions of said structure to cause said structure to flex outwardly when said joint rotates with the members thereof in angular relation one to the other.

3. A cover for a universal joint of the type which includes two coupling members pivotally connected for rotation about intersecting axes, said cover comprising two substantially cup-shaped sections of flexible material having their larger ends connected one with the other, the smaller end portions of said cup-shaped sections being adapted to fit snugly about the respective coupling members and having means for connecting the same therewith, the wall of each cup-shaped section being of reduced thickness adjacent the smaller end portion thereof to cause said wall to flex outwardly as said joint rotates with the members thereof in angular relation one to the other.

4. A cover for a universal joint of the type which includes two coupling members pivotally connected for rotation about intersecting axes, said cover comprising a tubular structure of flexible material having its end portions adapted to fit snugly about the respective coupling members in spaced relation to said pivotal connections and having means to hold the same against lengthwise movement on said coupling members, said structure also having an intermediate circumferential portion of greater diameter than said end portions and inclined walls connecting said intermediate portion with the respective end portions, the larger portion of said structure being of greater stiffness than the smaller portions, so that when unrestrained said structure will assume approximately the form of a double truncated cone and when said joint rotates with said coupling members in angularly displaced relation said inclined walls will fold one toward the other on the inner side of said joint on a fold line substantially coincident with said central circumferential portion of said structure.

5. A cover for a universal joint of the type which includes two coupling members pivotally connected for rotation about intersecting axes, said cover comprising a single tubular element of flexible material including two frusto-conical sections united one with the other at their larger ends, the smaller end portions of said sections being adapted to fit snugly about the respective coupling members in spaced relation to said pivotal connections and having means for holding the same against lengthwise movement on said coupling members, the inclined walls of said sections being of reduced thickness adjacent the end portions thereof, whereby when said joint rotates with said coupling members in angularly displaced relation those portions of said inclined walls on the inner side of said angularly displaced members will flex outwardly at those parts which are of reduced thickness and said portions of said walls will fold one toward the other on a circumferential fold line approximately coincident with the circumferential line on which said sections are united, and the inclination of the portions of said walls on the outer side of said members will be decreased in accordance with the displacement of said members.

6. A cover for a universal joint of the type which includes two coupling members pivotally connected for rotation about intersecting axes, said coupling members having circumferential recesses spaced from said pivotal connections, said cover comprising a tubular structure of flexible material having its end portions shaped to fit about the respective coupling members and provided with internal beads to extend into said recesses, said structure having an intermediate portion of enlarged diameter connected with said end portions by inclined walls, the larger portions of said walls being of greater thickness than the smaller portions thereof so that the rotation of said coupling members about intersecting axes will cause said inclined walls to flex outwardly on circumferential lines adjacent the smaller ends thereof, and means to positively retain said beads in said recesses during the flexing of said structure.

7. A cover for a universal joint of the type which includes two coupling members pivotally connected for rotation about intersecting axes, said cover comprising a tubular structure formed of two separate sections of flexible material having their adjacent ends enlarged and opposed one to the other, and means for connecting said opposed ends one with the other, the smaller ends of said sections being adapted to fit snugly about the coupling members of said joint and having means for holding the same against movement lengthwise thereof, and the circumferential wall of each section increasing in thickness toward the larger end of said section.

8. A cover for a universal joint of the type which includes two coupling members pivotally connected for rotation about intersecting axes, said cover comprising two cup-shaped sections of flexible material having small diameter portions to fit snugly about said coupling members and having means to hold the same against lengthwise movement on said members and having large diameter portions arranged in opposed relation, and means for securing the opposed ends of said sections one to the other, the walls of each section decreasing in thickness from said large diameter portion toward said small diameter portions.

9. A cover for a universal joint of the type which includes an annular member and two coupling members pivotally connected with said annular member on intersecting axes, said cover comprising two cup-shaped sections of flexible material having small diameter portions to fit about said coupling members, and large diameter portions arranged in opposed relation on opposite sides of said annular member, the walls of said sections being of reduced thickness adjacent the smaller portions thereof, means for securing said large diameter portions to said annular member, and means for holding said smaller diameter portions against lengthwise movement on said coupling members.

10. A cover for a universal joint of the type which includes two coupling members pivotally connected for rotation about intersecting axes, said cover comprising a tubular structure of elastic material having portions shaped to fit about the respective coupling members and having an intermediate portion of enlarged diameter, and means for rigidly connecting said end portions with said coupling members at points spaced one from the other a distance different from the initial distance between the parts of said end portions which are so connected so as to preload said cover and cause the same to hold the contacting parts of said coupling members in constant contact one with the other.

11. A cover for a universal joint of the type which includes two coupling members pivotally connected for rotation about intersecting axes, said coupling members having circumferentially arranged recesses spaced from said pivotal connections, said cover comprising a tubular structure of elastic material having its end portions shaped to fit about the respective coupling members and provided with parts to extend into said recesses, said structure having an intermediate portion of enlarged diameter connected with said end portions by inclined walls, the initial distance between said parts of said end portions being less than the distance between said recesses when said coupling members are in alinement, whereby the seating of said parts in said recesses places said cover structure under longitudinal tension.

12. A cover for a universal joint of the type which includes two coupling members pivotally connected for rotation about intersecting axes, said cover comprising a tubular structure of elastic material having end portions shaped to fit about the respective coupling members and having an intermediate portion of enlarged diameter, and means for connecting said end portions with said coupling members at points spaced one from the other a distance greater than the initial distance between the parts of said end portions which are so connected and to thus place said cover structure under longitudinal tension.

13. A cover for a universal joint of the type which includes two coupling members pivotally connected for rotation about intersecting axes, said cover comprising a tubular structure of elastic material having between its ends a portion of enlarged diameter and having its end portions adapted to fit about said coupling members, and means for connecting said end portions to said coupling members with said structure under longitudinal tension and for holding said end portions against longitudinal and circumferential movement with relation to said coupling members.

GEORGE B. STILLWAGON, Jr.
KENNETH G. FRASER.